(12) United States Patent
Demsey et al.

(10) Patent No.: US 7,246,346 B2
(45) Date of Patent: Jul. 17, 2007

(54) SYSTEM AND METHOD FOR PERSISTING DYNAMICALLY GENERATED CODE IN A DIRECTLY ADDRESSABLE AND EXECUTABLE STORAGE MEDIUM

(75) Inventors: Seth M. Demsey, Kirkland, WA (US); Brian J. Smith, Seattle, WA (US); Scott M. Corbin, Carnation, WA (US); Michael D. Smith, Kirkland, WA (US); W. Michael Zintel, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 10/245,994

(22) Filed: Sep. 17, 2002

(65) Prior Publication Data

US 2004/0054994 A1  Mar. 18, 2004

(51) Int. Cl.
*G06F 9/45* (2006.01)
*G06F 3/06* (2006.01)
*G06F 12/00* (2006.01)

(52) U.S. Cl. .......................... 717/147; 711/4; 711/103
(58) Field of Classification Search ................ 717/146, 717/148, 130, 151
See application file for complete search history.

(56) References Cited

U.S. PATENT DOCUMENTS

| 5,537,531 | A * | 7/1996 | Suga et al. ............. 345/543 |
| 6,484,313 | B1 * | 11/2002 | Trowbridge et al. ...... 717/146 |
| 6,725,342 | B1 * | 4/2004 | Coulson ................ 711/141 |
| 6,820,255 | B2 * | 11/2004 | Babaian et al. .......... 717/151 |
| 6,970,565 | B1 * | 11/2005 | Rindsberg .............. 380/270 |
| 2002/0169950 | A1 * | 11/2002 | Esfahani et al. ........... 713/2 |
| 2004/0073783 | A1 * | 4/2004 | Ritchie .................. 713/1 |

OTHER PUBLICATIONS

"Non-Volatile Memory for Fast, Reliable File Systems", Mary Baker et al., Sep. 1992, ACM SIGPLAN Notices, Proceedings of the fifth international conference on Architectural support for programming languages and operating systems.*

Timothy Sherwood et al., "Patchable Instruction ROM Architecture", pp. 24-33, 1991; Proceedings of the 2001 international conference on Compilers, architecture, and synthesis for embedded systems.*

(Continued)

*Primary Examiner*—Wei Zhen
*Assistant Examiner*—Chih-Ching Chow
(74) *Attorney, Agent, or Firm*—Merchant & Gould P.C.

(57) ABSTRACT

The present invention is directed at a virtual machine environment operating on portable devices with limited resources. The virtual machine environment includes a method for compiling an intermediate language into native code wherein the native code is stored in a directly addressable and executable storage medium, such as flash memory. A portion of the native code is written to a cache resident in volatile memory during compiling. The cache is written to the directly addressable and executable storage medium. The cache may be sized in relation to a block size associated with the directly addressable and executable storage medium. A metadata map is maintained and associates a physical address at which the native code is stored in the storage medium with the method. The native code is persisted by storing the metadata map in the storage medium and associating the metadata map with the method.

26 Claims, 6 Drawing Sheets

OTHER PUBLICATIONS

Joch, Alan, "Compilers, Interpreters, And Bytecode", *Computerworld*, vol. 35, No. 4 (Jan. 22, 2001).

Walsh, Jeff et al., "Java Speed Tops List Of Priorities", *Info World*, vol. 19, No. 23, p. 29 (Jun. 29, 1997).

Radhakrishnan, Ramesh et al., "Java Runtimes Systems: Characterization And Architectural Implications", *IEEE Transactions on Computers*, vol. 50, pp. 131-146 (Feb. 2001).

Radhakrishnan, R. et al., "Architectural Issues In Java Runtimes Systems", *Proceedings Sixth International Symposium on High-Performance Computer Architecture*, pp. 387-398 (1999).

Hardin, David S., "Real-Time Objects on the Bare Metal: An Efficient Hardware Realization of the Java Virtual Machine", *Fourth IEEE International Symposium on Object-Oriented Real Time Distributed Computing*, pp. 53-59 (2001).

\* cited by examiner

SYSTEM AND METHOD FOR PERSISTING DYNAMICALLY GENERATED CODE IN A DIRECTLY ADDRESSABLE AND EXECUTABLE STORAGE MEDIUM

BACKGROUND OF THE INVENTION

There are many programming languages available for developing applications. Examples of such programming languages include C, C++, and C#. These programming languages provide a syntax for writing source code in a manner such that a static compiler can compile the source code into an object file. The object file is then linked with one or more other object files using a linker. The resulting file, after linking these object files, is an executable file for an application. Because different types of computers have different processors and each processor has a different instruction set, the source code is re-compiled and re-linked to create an executable file for each type of processor. Thus, multiple executable files are created for use on different processors. A software vendor must then test and maintain each of these executable files.

With the advent of the Internet in which many different types of computers are networked together, the problem with generating multiple executable files for different processors became even more undesirable. Therefore, mark-up languages, such as HTML, became popular. Mark-up languages allow the creation of one file that can be distributed to computers having different processors without having to generate individual files for the different processors. The mark-up files are interpreted during run-time for execution. In a further development, intermediate languages were developed that provide the ease of mark-up languages while, in most cases, providing faster program execution speeds than the interpretive process. A "just-in-time" compiler (hereinafter, referred to as a JIT compiler) translates the intermediate language into native code for a specific processor. Each computer having a different type of processor has its own version of a JIT compiler that compiles the intermediate format file to its respective native code, which is CPU-dependent. Thus, these intermediate languages allow software vendors to generate one file (an intermediate format file) and distribute that file to computers having various processors.

Typically, during JIT compiling of the intermediate format file, the native code is not created until the underlying method within the intermediate format file is called. Therefore, the JIT compilation process takes place during the program execution. In addition, the JIT compiler typically compiles methods on a method by method basis after the method has been called. If the same method is called again later, the JIT compiler does not process the method again, but rather re-executes the native code that was previously stored. These types of environments which have self-contained operating environments for processing CPU-independent code are commonly referred to as virtual machine environments.

While the concept of using intermediate code and JIT compilers is very desirable, this concept currently is limited to computers with adequate resources, such as memory. This limitation is due to the additional cost (both CPU and memory) associated with performing the compilation process (e.g., syntax analysis) during execution. In systems that are constrained by the amount of available random access memory, the storage of the JIT generated code is not practical. The JIT generated code consumes too much of the available RAM space. While these small computing devices could JIT compile the intermediate code each time without storing the JIT generated code, the execution speed of the applications would not be acceptable. Thus, small consumer devices, such as cell phones, personal digital assistants, and the like, currently have limited opportunity for dynamically generating code. Due to at least these limitations, the current environment for dynamic code generation is not ideal.

SUMMARY OF THE INVENTION

The present invention is directed at a virtual machine environment operating on devices with limited CPU or memory resources. The virtual machine environment includes a method for compiling an intermediate language into native code wherein the native code is stored in a directly addressable and executable storage medium, such as flash memory. The virtual machine environment further includes a method for executing the native code directly from the directly addressable and executable storage medium. Because the virtual machine environment of the present invention stores and executes the native code within the directly addressable and executable storage medium without storing the native code in RAM, the present invention allows small computing devices with limited memory resources (e.g., RAM) the ability to dynamically generate code from an intermediate language format. The present invention allows small computing devices (e.g., portable devices) to take advantage of dynamic code generation, and allows small computing devices the ability to realize the benefits of dynamic code generation, such as processor-neutrality and increased execution speeds.

DETAILED DESCRIPTION OF THE PREFERRED EMBODIMENT

Briefly stated, the present invention is directed at a virtual machine environment operating on portable devices with limited resources. The virtual machine environment includes a method for compiling an intermediate language into native code wherein the native code is stored in a directly addressable and executable storage medium, such as flash memory. The virtual machine environment further includes a method for executing the native code directly from the directly addressable and executable storage medium. Because the virtual machine environment of the present invention stores and executes the native code within the directly addressable and executable storage medium without storing the native code in RAM, the present invention allows small computing devices with limited memory resources (e.g., RAM) the ability to dynamically generate code from an intermediate language format. The present invention allows small computing devices (e.g., portable devices) to take advantage of dynamic code generation, and allows small computing devices the ability to realize the benefits of dynamic code generation, such as processor-neutrality and increased execution speeds.

Figure 1:
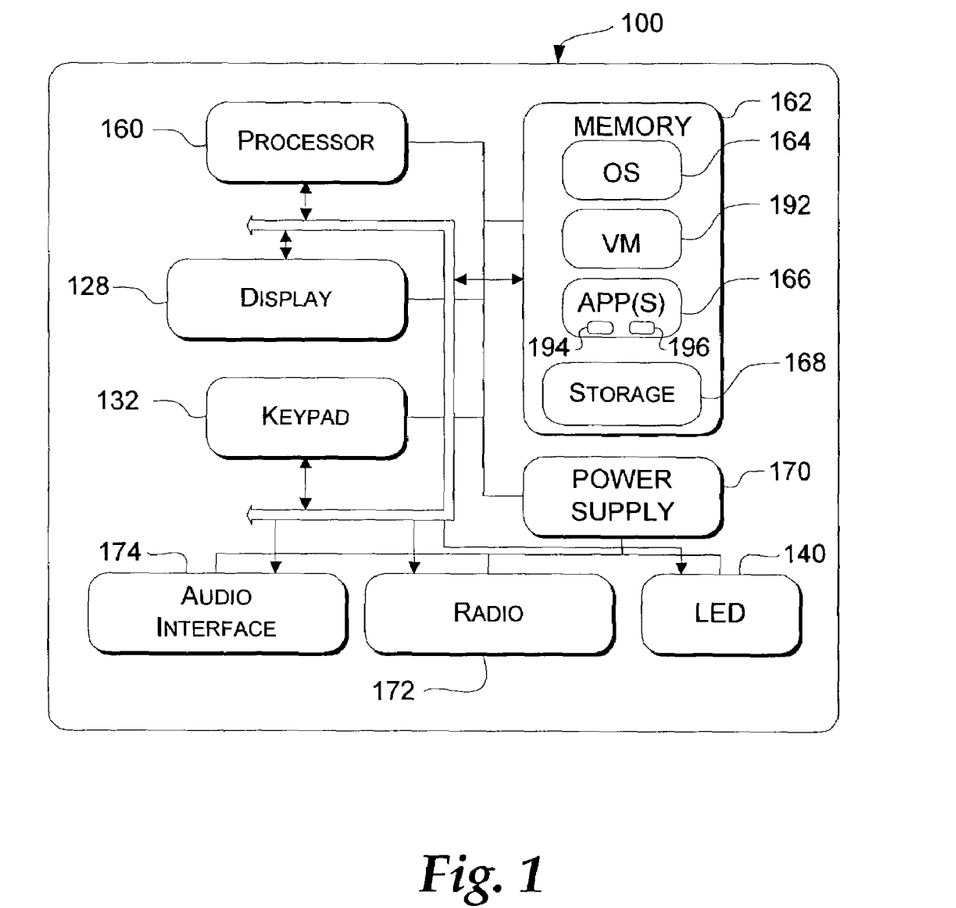
FIG. 1 illustrates an exemplary computing device that may be used in one exemplary embodiment of the present invention.

FIG. 1 illustrates an exemplary mobile computing device, such as mobile device 100, adapted for use in one implementation of the present invention. Mobile device 100 has a processor 160, a memory 162, a display 128, and a keypad 132. Briefly, memory 162, described in detail below and illustrated in FIG. 3, generally includes both volatile memory (e.g., RAM) and non-volatile memory (e.g., ROM, flash memory, and/or the like). Mobile device 100 includes an operating system 164, which is resident in memory 162 and executes on processor 160. Keypad 132 may be a push button numeric dialing pad (such as on a typical telephone), a multi-key keyboard (such as a conventional keyboard), or the like. Display 128 may be a liquid crystal display, or any other type of display commonly used in mobile computing devices. Display 128 may be touch-sensitive, and would then also act as an input device.

Figure 5:
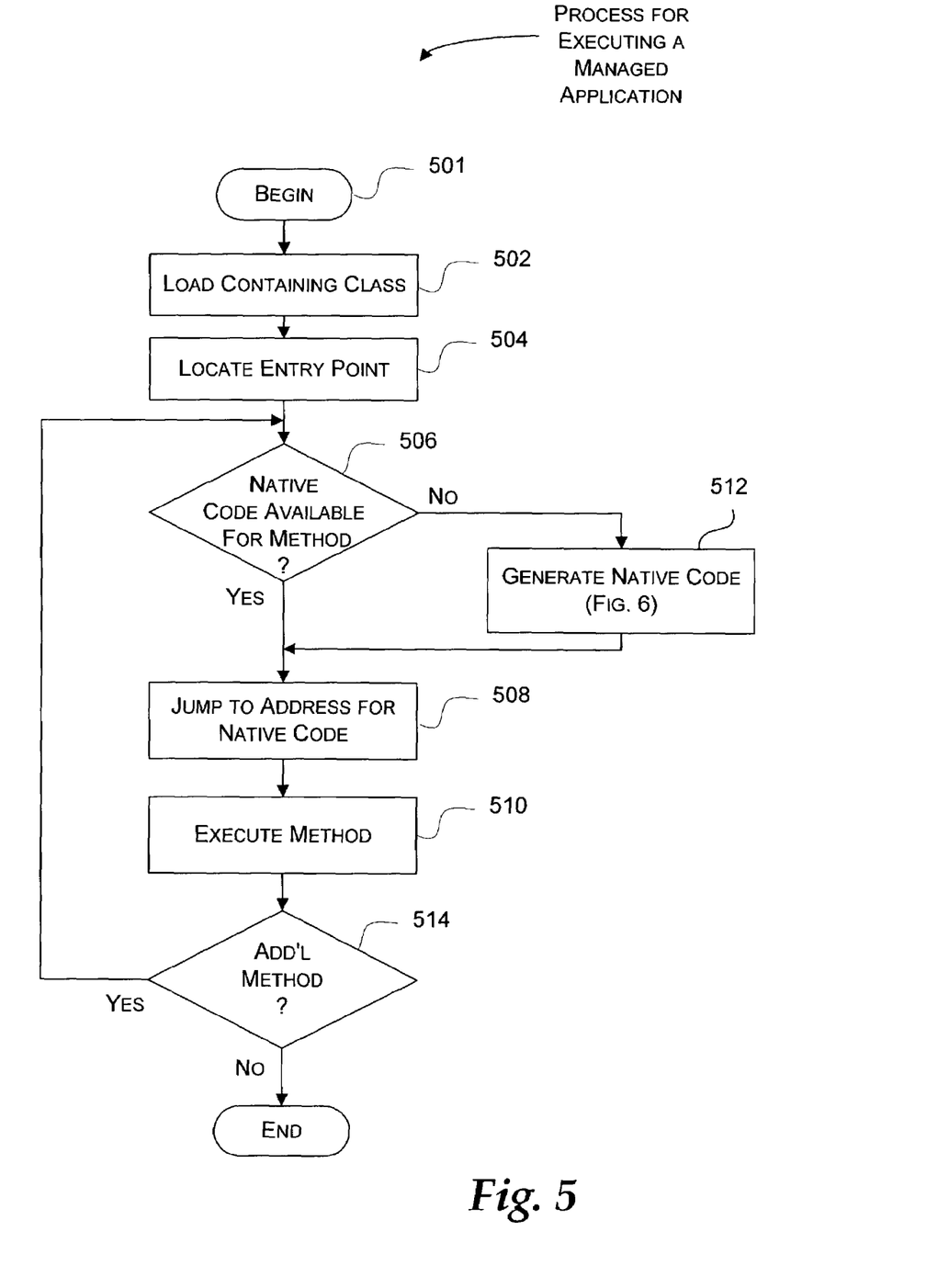
FIG. 5 is a logical flow diagram of a process for executing a managed application.
Figure 6:
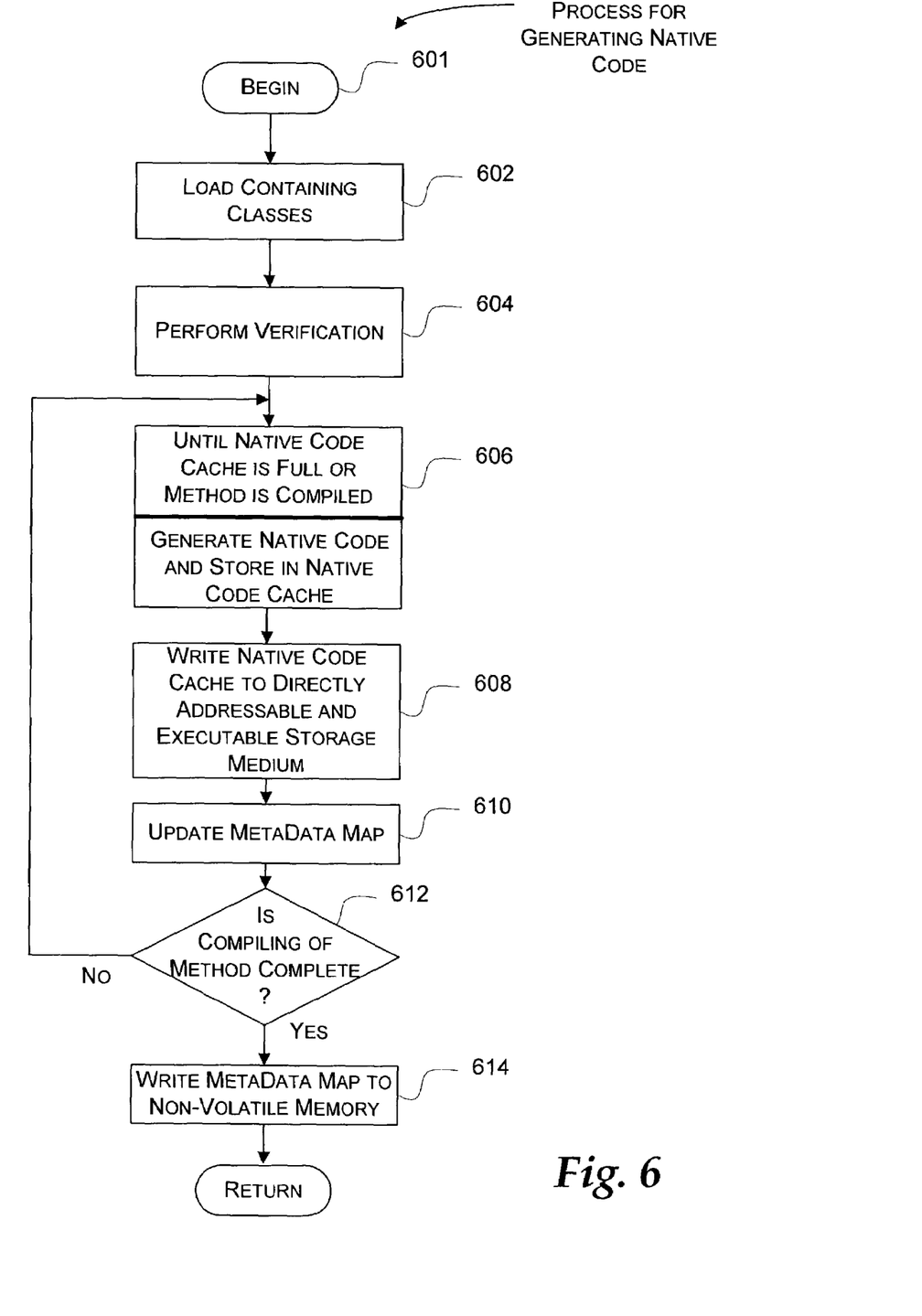
FIG. 6 is a logical flow diagram of a process for generating native code for the managed application that is suitable for use in FIG. 5 in accordance with one embodiment of the present invention.

One or more application programs 166 are loaded into memory 162 and may run on operating system 164. Examples of application programs include phone dialer programs, e-mail programs, scheduling programs, PIM (personal information management) programs, word processing programs, spreadsheet programs, Internet browser programs, and so forth. Application programs 166 include one or more managed code applications 194 and one or more unmanaged code applications 196. Managed code applications 194 refer to code that is written in an intermediate language (CPU-independent code) that need to be compiled into native code before execution of the application. Unmanaged code applications 196 refer to code (CPU-dependent code) that is in a format that can be executed without additional compilation. Unmanaged code applications 196 are typically binary files. In addition, memory 162 further stores a virtual machine 192. Briefly, virtual machine, described later in conjunction with the flow diagrams in FIGS. 5 and 6, is responsible for processing the managed code applications 194. The virtual machine 192 may be part of the operating system 164, may be one of the application programs 166, or may be layered on top of the operating system.

Mobile device 100 also includes non-volatile storage 168 within the memory 162. Non-volatile storage 168 may be used to store persistent information which should not be lost if mobile device 100 is powered down. The applications 166 may use and store information in storage 168, such as e-mail or other messages used by an e-mail application, contact information used by a PIM, appointment information used by a scheduling program, documents used by a word processing application, and the like. Although shown separately in FIG. 1, applications 166, virtual machine 192, and the operating system 164 may be stored in storage 168. In one embodiment, described in detail later in conjunction with FIGS. 5 and 6, the virtual machine 192 persists dynamically generated code in the non-volatile storage 168 and executes the dynamically generated code directly from the non-volatile storage 168.

Mobile device 100 has a power supply 170, which may be implemented as one or more batteries. Power supply 170 might further include an external power source, such as an AC adapter or a powered docking cradle that supplements or recharges the batteries.

Mobile device 100 is also shown with two types of external notification mechanisms: an LED 140 and an audio interface 174. These devices may be directly coupled to power supply 170 so that when activated, they remain on for a duration dictated by the notification mechanism even though processor 160 and other components might shut down to conserve battery power. LED 140 may be programmed to remain on indefinitely until the user takes action to indicate the powered-on status of the device. Audio interface 174 is used to provide audible signals to and receive audible signals from the user. For example, audio interface 174 may be coupled to a speaker for providing audible output and to a microphone for receiving audible input, such as to facilitate a telephone conversation.

Mobile device 100 may also include a radio 172 that performs the function of transmitting and receiving radio frequency communications. Radio 172 facilitates wireless connectivity between the mobile device 100 and the outside world, via a communications carrier or service provider. Transmissions to and from the radio 172 are conducted under control of the operating system 164. In other words, communications received by the radio 172 may be disseminated to application programs 166 via the operating system 164, and vice versa.

The radio 172 allows the mobile device 100 to communicate with other computing devices, such as over a network. The radio 172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
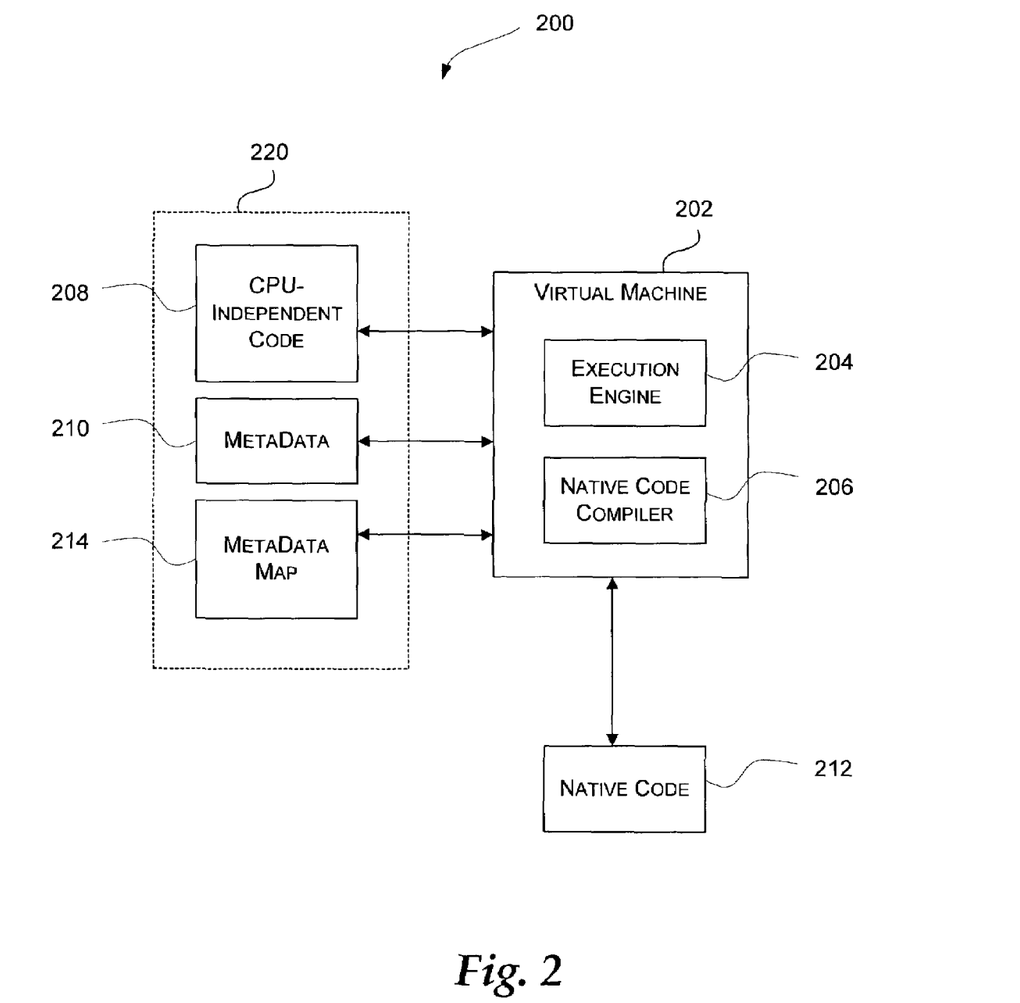
FIG. 2 is a block diagram generally illustrating an overview of one embodiment for a virtual machine environment in which the present invention may operate.

FIG. 2 is a block diagram generally illustrating an overview of one embodiment for a virtual machine environment in which the present invention may operate. The virtual machine environment 200 includes a virtual machine 202 comprising an execution engine 204 and a native code compiler 206. When a managed program is selected for execution, such as by tapping an icon on a touch-sensitive display on mobile device 100 shown in FIG. 1 associated with the managed program, the virtual machine 202 initiates processing of the managed program in an application domain. The execution engine 204 reads CPU-independent instructions 208 associated with the managed program and reads metadata 210 associated with the managed program. In one embodiment, the CPU-independent instructions and the metadata are contained together within one file (e.g., a portable executable (PE) file 220). The PE file 220 enables the virtual machine to recognize common language runtime (CLR) images.

Metadata 210 describes the types of objects and variables used within the CPU-independent instructions 208, a definition for each type, a signature for each member of the type, a signature for the members that are referenced, and other data useful during runtime. Because the metadata 208 within the PE file 220 identifies the objects and provides other useful information, type libraries and Interface Definition Language (IDL) are not necessarily needed when compiling the intermediate language into native code 212. Instead, the virtual machine 202 locates and extracts the metadata 210 from the file as needed in order to execute the requested methods. The metadata in the PE file aids the virtual machine in generating the native code based on the intermediate language instructions. The metadata 210 may also include a filename, a version, and the like, associated with the managed program.

The virtual machine environment 200 also includes a metadata map 214. In one embodiment, the metadata map 214 is included within the PE file 220. The metadata map 214, illustrated in FIG. 4 and described in detail below, aids the virtual machine 202 in determining whether a requested method has already been compiled into native code 212 and is available for execution. In accordance with the present invention, the native code is persisted in a non-volatile memory. If the native code 212 associated with the managed program is overwritten in memory 162 (FIG. 1), the metadata map 214 is updated to reflect this change. In this case, the next time the native code 212 associated with the managed program is requested, the metadata map 214 is re-populated as the native code 212 is dynamically generated.

Figure 3:
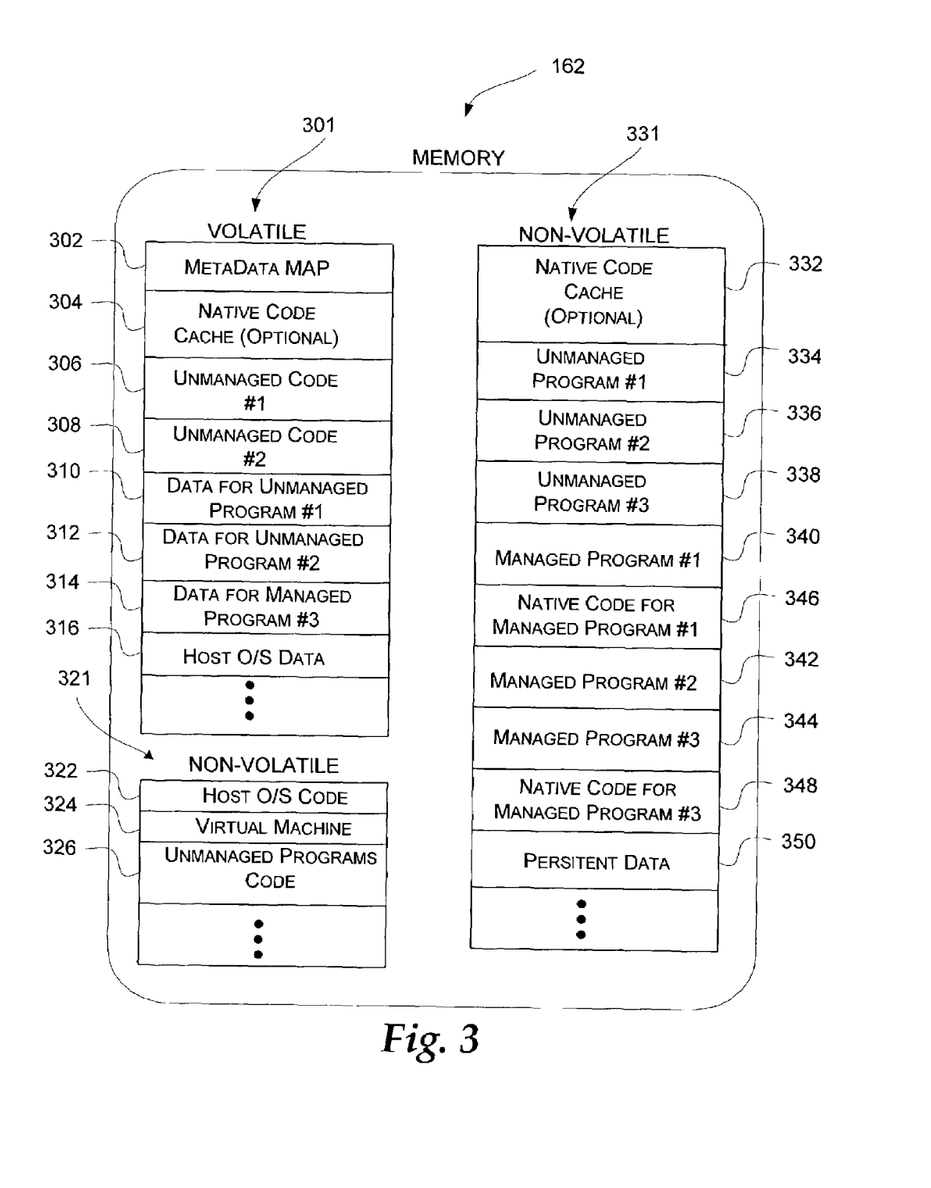
FIG. 3 graphically depicts the memory in the computing device shown in FIG. 1 separated into a volatile and a non-volatile portion, wherein each portion is shown storing respective information in accordance with the present invention.

FIG. 3 graphically depicts one embodiment of memory 162 in the computing device 100 shown in FIG. 1. In FIG. 3, memory 162 is graphically separated into volatile memory 301 and non-volatile memory 321 and 331. Volatile memory 301 represents memory that will loose data when power is removed, such as random access memory (RAM). In the following discussion, volatile memory 301 may be referred interchangeably as RAM 301. Non-volatile memory 321 and 331 represent memory that will maintain the data stored therein even when power is removed, such as read only memory (ROM), flash memory, and the like. For convenience, the following discussion refers to non-volatile memory 321 as ROM 321, interchangeably, and refers to non-volatile memory 331 as Flash 331, interchangeably. While FIG. 3 graphically illustrates memory 162 having two non-volatile memories 321 and 331, one skilled in the art will appreciate that the present invention may be implemented with one or any number of non-volatile memories without departing from the scope of the present invention.

Non-volatile memory 331 is directly addressable, which means a physical address may be used to locate information within the non-volatile memory 331. In addition, non-volatile memory 331 is directly executable, which means once the physical address is determined, instructions at that physical address may be executed without loading the instructions into volatile memory 301. Typically, this is achieved by loading the physical address associated with the information of interest into an instruction pointer. Non-volatile memory 331 includes FlashMemory, Sony MemoryStick, Secured Digital, and the like.

RAM 301 may store portions of code from one or more unmanaged programs (e.g., unmanaged code 306 and 308), along with unmanaged data 310 and 312 associated with unmanaged code 306 and 308, respectively. In addition, in accordance with the present invention, RAM 301 may store managed data (e.g., managed data 314) for a managed program that is stored in flash 331. As mentioned above, unmanaged code refers to executable code that is compiled in the traditional manner from source code to a CPU-specific set of instructions. Managed code refers to a set of CPU-independent instructions that is compiled from source code, but is not in an executable format. Native code refers to the set of CPU-dependent instructions that is dynamically generated during run-time from the CPU-independent instructions.

RAM 301 may also store host operating system data 316, a metadata map 302, which will be described later in detail in conjunction with FIG. 4, and an optional native code cache 304. Briefly, the native code cache 304 provides temporary storage for the native code compiler 206 (FIG. 2) so that the compiler can write portions of the native code to flash 331. Because the CPU-independent instructions are compiled into native code just-in-time (JIT) for execution, this compiling process is sometimes referred to as JIT compiling and the native code may be referred to as JIT code.

In one embodiment, ROM 321 may store host operating system code 322, virtual machine code 324, and/or unmanaged code 326. In other embodiments, any, or a portion of the code 322–326, may be stored in other non-volatile memory, such as flash 331. Flash 331, may store one or more unmanaged programs (e.g., unmanaged programs 334, 336, and 338), one or more managed programs (e.g., managed programs 340, 342, and 344), native code (e.g., native code 346 and 348) for one or more managed programs and persistent data 350. Persistent data 350 includes files that contain information that needs to be available at a later time. In contrast to prior virtual machine environments, the present invention provides a method for storing the native code 346 and 348 in the flash 331, rather than storing the native code 346 and 348 in volatile memory 301. Thus, the present invention allows small computing devices with limited resources, such as RAM, to take advantage of intermediate languages. The present invention also achieves other benefits too. For example, because the present invention executes directly from flash 331, less power is consumed than when the native code is executed from RAM.

As illustrated in FIG. 3, unmanaged programs (e.g., unmanaged program 334) need to have a portion of the unmanaged program (i.e., unmanaged code 306) loaded into RAM 301 in order to execute. In accordance with the present invention, managed programs (e.g., managed program 340) do not have executable code loaded into RAM 301. Therefore, the managed programs do not consume valuable resources when executing. Rather, managed program 340 has its associated native code 346 stored in flash 331. In one embodiment, data (e.g., managed data 314) associated with managed program 344 is stored in RAM. However, in another embodiment, managed data 314 may be stored in flash 331.

Figure 4:
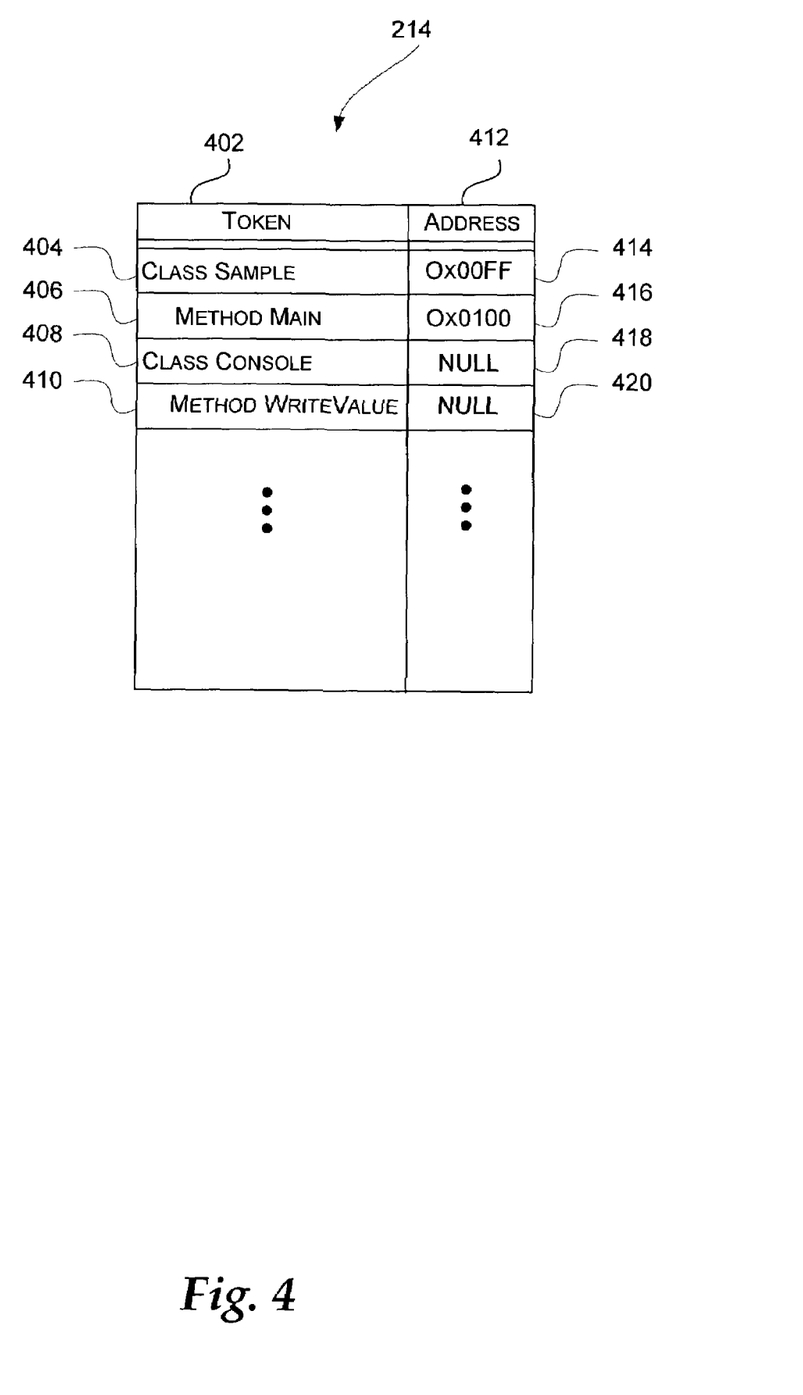
FIG. 4 illustrates salient portions of the metadata map stored in the memory shown in FIG. 3.

FIG. 4 illustrates salient portions of the metadata map stored in the memory shown in FIG. 2. In general, metadata map 214 includes a list of pointers to objects stored in flash 331 and provides a look-up mechanism for enabling the virtual machine to easily jump to the correct address within the flash 331 to execute the requested code. The metadata map 214 includes a token field 402 and an address offset field 404 for each object. The token field 402 is unique for each object and may be a signature associated with the object. Objects include classes (e.g., class 406 and 408), methods (e.g., method 410 and 412), and the like. The address offset field 404 identifies a physical address at which the associated object is stored in flash 331 as native code.

Flow diagrams illustrated in FIGS. 5 and 6, in conjunction with the metadata map in FIG. 3, will now be used to discuss the operation of the virtual machine in accordance with the present invention. The discussion will be based on an excerpt of source code as follows:

```
Public Class Sample
{
    Public static void main ( )
    {   int i=1;
        int x = 2;
        int y = i + x;
        console.writeline(y);
    }
}
```

FIG. 5 is a logical flow diagram generally illustrating a process for executing a managed application having CPU-independent instructions. Process 500 begins after a managed application (e.g., Sample) has been selected for execution. A file with CPU-independent instructions associated with the selected managed application is available. Continuing with the above example, the sample class would already be compiled into an intermediate language format that includes CPU-independent instructions for loading, storing, initializing, and calling methods on objects, as well as instructions for arithmetic and logical operations, control flow, direct memory access, exception handling, and other operations. The process continues at block 502.

At block 502, the virtual machine loads the base classes. The base classes includes objects that the managed application inherits. The process continues at block 504.

At block 504, an entry point for the managed application, commonly labeled "main( )" in the source code, is located. The determination of the entry point is based on metadata associated with the managed application. Thus, continuing with the above example, the CPU-independent instruction associated with the main( ) function are loaded into memory for processing. These CPU-independent instructions are loaded into RAM 201 (FIG. 2), such as Host O/S Data 316, in the embodiment in which the operating system includes the virtual machine. Processing continues at decision block 506.

At decision block 506, a determination is made whether the native code associated with a requested method has already been compiled. As discussed above, the metadata map associated with the managed program will indicate whether or not the native code is available, such as using a null pointer in the address offset field if native code associated with the object is not available. Assuming, that the native code is available, processing continues at block 508.

At block 508, the virtual machine jumps to the address specified in the address offset field of the metadata map. In one embodiment, the virtual machine loads an instruction pointer with the address. In prior virtual machine environments, the address designated a memory location within RAM 201 (FIG. 2). However, in accordance with the present invention, the address designates a memory location within Flash 231. Processing continues at block 510.

At block 510, the requested method is executed. In accordance with the present invention, the requested method is executed in place on the non-volatile memory 331. This reduces the amount of power that is consumed during program execution because read operations to non-volatile memory 331 consume less power than read operations to RAM 301. Because the intermediate language code is compiled just-in-time for execution, if one method calls another method, the processing performed by blocks 506–512 is performed on the called method before processing is completed on the method which called. In one embodiment, one method is processed per-thread, with multiple threads being in various states of processing. For example, in the Sample source code above, main( ) may be processing in one thread. Once the thread associated with main( ) recognizes that another method has been called (e.g., console.writeline( )), another thread begins processing of the called method (e.g., console.writeline( )). Thus, FIG. 5 represents a per-thread control flow for executing a managed application. Once all the methods within the managed application have executed, processing is complete.

Returning to decision block 506, if the native code for the requested method is not available, processing continues at block 512. At block 512, the virtual machine dynamically generates the native code. As will be described in detail below, in accordance with the present invention, the native code compiler persists the native code by storing the native code in the non-volatile memory 331. Once the native code has been generated, processing continues at block 508 and proceeds as described above.

FIG. 6 is a logical flow diagram illustrating a process for generating native code that is suitable for use in FIG. 5 in accordance with one embodiment of the present invention. Processing begins at block 601, where a method has been called that needs to be compiled into native code. In one embodiment, a native code cache is available for temporarily storing native code. For this embodiment, the native code cache is sized in relation to a block size associated with the non-volatile memory 331. In one embodiment, the cache size may be equal to the block size. As discussed above, writing the native code to the native code cache stored in RAM 301 and then writing the cache to the non-volatile memory improves the efficiency of dynamic code generation. Processing continues at block 602.

At block 602, containing classes associated with the method are loaded. Processing optionally continues at block 604. At block 604, a verification may optionally be performed to ensure that the code is well formed. Processing continues at block 606.

At block 606, the virtual machine compiles the CPU-independent instructions into native code. In one embodiment, the native code is temporarily written into the native code cache until the native code cache is full or until the method has been completely compiled. In one embodiment, the native code cache is sized in relation to a block size associated with the non-volatile memory. For example, the native code cache may be equal to the block size of the non-volatile memory. In another embodiment, the native code cache is sized sufficiently to hold multiple methods. The methods are then stored to the non-volatile memory when the native code cache is full or on an as needed basis. Processing continues at block 608.

At block 608, the native code cache is written to the non-volatile memory 331. When the native code is written into the non-volatile memory, the virtual machine retains the physical address at which the native code was written. Processing continues at block 610.

At block 610, the metadata map associated with the managed program is updated using the physical address at which the native code was written. If the method involves several writes of the native code cache to the non-volatile memory, the metadata map may not be updated each time. Rather, the metadata map may be updated just once, such as on the first or last write to the non-volatile memory. It is important that the metadata map is updated at some time with the physical address at which the native code can be executed. Processing continues at decision block 612.

At decision block 612, a determination is made whether the method has been completely compiled. If the method has not been completely compiled, processing loops back to block 606 and proceeds as described above. However, if the method has been completely compiled, processing continues at block 614.

At block 614, in one embodiment, the metadata map stored on the non-volatile memory associated with the managed program may be updated with the new physical address at which the native code for this method may be executed. By updating the metadata map on the non-volatile memory, later, perhaps when this application is initiated again, the virtual machine can identify which methods have already been compiled. Therefore, the native code for the compiled methods may be executed directly without re-compiling. Thus, the virtual machine is responsible for properly maintaining the metadata map stored on the non-volatile memory. For example, if another managed program overwrites a portion of the native code for a first managed program, the metadata map associated with the first managed program must be properly updated. In one embodiment, the metadata map stored on the non-volatile memory associated with the first managed program is cleared, such that all information is lost even if only one method was overwritten. Thus, by maintaining the metadata map on the non-volatile memory in accordance with the present invention, the present invention can persist dynamically generated code for a longer duration than current virtual machine environments that store the dynamically generated code in RAM. Processing then continues to return block.

Referring to the example source code above in conjunction with FIG. 4, class sample object 404 and method main 406 have been successfully compiled into native code. The address offset for the class sample object 404 and the method main 406 are 0x00FF and 0x0100, respectively. These address offsets refer to physical addresses within the non-volatile memory 331. The other two objects, objects 408 and 410, have not been compiled into native code. Thus, the address offset field for those two objects contain "NULL".

While the above discussion focuses on small computing devices, one skilled in the art will readily appreciate that the present invention may be incorporated on systems that do not have resource limitations, if desired. For example, because non-volatile memory may be less expensive than RAM, these systems may desire to implement the present invention for cost considerations.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for persisting dynamically generated code, the method comprising:
   receiving a request for a program coded within a CPU-independent file;
   compiling the program into CPU-dependent instructions during run-time;
   writing the CPU-dependent instructions to a non-volatile memory; wherein the non-volatile memory has write access and wherein the non-volatile memory includes host operating system code that may be used in executing the CPU-dependent instructions; and
   executing the CPU-dependent instructions only from the non-volatile memory on a mobile device.

2. The computer-implemented method of claim 1, the non-volatile is flash memory.

3. The computer-implemented method of claim 1, wherein the CPU-independent file is written in an intermediate language.

4. The computer-implemented method of claim 1, wherein the intermediate language is a compiled version of a source file.

5. The computer-implemented method of claim 1, wherein storing the CPU-dependent instructions comprises writing a portion of the CPU-dependent instructions into a cache that is resident within the volatile memory and writing the cache into the non-volatile memory.

6. The computer-implemented method of claim 5, wherein the cache is sized in relation to a block size associated with the non-volatile memory.

7. The computer-implemented method of claim 5, wherein writing the cache into the non-volatile memory occurs after the program is finished compiling.

8. The computer-implemented method of claim 5, wherein writing the cache into the non-volatile memory occurs after the cache is full.

9. The computer-implemented method of claim 1, further comprising updating a metadata map with a physical address at which the CPU-dependent instructions are stored in the non-volatile memory.

10. The computer-implemented method of claim 9, wherein the metadata map is stored in the non-volatile memory.

11. The computer-implemented method of claim 10, further comprising determining whether the CPU-dependent instructions associated with the program are stored in the non-volatile memory, and if so, executing the CPU-dependent instructions without performing the compiling and storing steps.

12. The computer-implemented method of claim 11, wherein determining whether the CPU-dependent instructions are stored in the non-volatile memory includes reading the metadata map to determine whether the physical address is stored therein.

13. A system that persists dynamically generated native code, system comprising:
   a processor;
   a volatile memory;
   a non-volatile memory that include write access; and
   a virtual machine, comprising:
      a native code compiler configured to dynamically compile a program written in CPU-independent code that is loaded into the volatile memory into a corresponding native code and to write the corresponding native code in the non-volatile memory; and
      an execution engine configured to directly address the corresponding native code stored in the non-volatile memory using operating system code that is stored within the non-volatile memory and to execute the corresponding native code without copying the native code to the volatile memory and without executing any of the native code that was compiled from the volatile memory on a mobile device.

14. The system of claim 13, wherein the native code compiler is further configured to store the corresponding native code in a cache in the volatile memory before storing the native code in the non-volatile memory.

15. The system of claim 14, wherein the cache is in relation to a block size associated with the non-volatile memory and storing occurs after the cache is full.

16. The system of claim 14, wherein storing occurs after the cache is full.

17. The system of claim 14, wherein storing occurs after the program is compiled.

18. The system of claim 13, wherein the virtual machine maintains a metadata map that identifies an address at which the program is stored in the non-volatile memory.

19. The system of claim 18, wherein the metadata map is written to the non-volatile memory and the virtual machine reads the metadata map to determine whether the corresponding native code exists in the non-volatile memory, and if so, executing the corresponding native code without performing the compiling and the storing.

20. The system of claim 13, wherein the non-volatile memory comprises a directly addressable and executable storage medium.

21. The system of claim 20, wherein the non-volatile memory includes flash memory.

22. A computer-readable storage medium having computer-executable instructions for persisting dynamically generate code, the instructions comprising:
    compiling a program written in CPU-independent instructions into native code during run-time;
    writing the native code into a non-volatile memory; wherein the non-volatile memory has write access; and
    executing the native code directly from the non-volatile memory without executing any portion of the native code from a volatile memory; wherein the non-volatile memory includes operating system code that is used in executing the native code directly from the non-volatile memory on a mobile device.

23. The computer-readable storage medium of claim 22, wherein storing the native code comprises writing a portion of the native code into a cache that is resident within the volatile memory and writing the cache into the non-volatile memory.

24. The computer-readable storage medium of claim 23, wherein writing the cache into the non-volatile memory occurs after the program is finished compiling.

25. The computer-readable storage medium of claim 23, wherein writing the cache into the non-volatile memory occurs alter the cache is full.

26. The computer-readable storage medium of claim 22, further comprising maintaining a metadata map by writing a physical address at which the native code is stored in the non-volatile memory into the metadata map, the physical address being associated with the program in the metadata map.

* * * * *